United States Patent
Hasegawa

(10) Patent No.: US 9,243,821 B2
(45) Date of Patent: Jan. 26, 2016

(54) VEHICLE NOISE-PROOF COVER

(71) Applicant: TOKAI RUBBER INDUSTRIES, LTD., Aichi-ken (JP)

(72) Inventor: Koichi Hasegawa, Aichi-ken (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 0 days.

(21) Appl. No.: 14/312,963

(22) Filed: Jun. 24, 2014

(65) Prior Publication Data

US 2014/0305140 A1 Oct. 16, 2014

Related U.S. Application Data

(63) Continuation of application No. PCT/JP2013/061754, filed on Apr. 22, 2013.

(30) Foreign Application Priority Data

Aug. 28, 2012 (JP) .................................. 2012-187481

(51) Int. Cl.
*F25B 21/02* (2006.01)
*B60R 13/08* (2006.01)
*F02B 77/13* (2006.01)

(52) U.S. Cl.
CPC .................. *F25B 21/02* (2013.01); *B60R 13/08* (2013.01); *B60R 13/0884* (2013.01); *F02B 77/13* (2013.01); *F25B 2321/023* (2013.01); *Y02T 10/166* (2013.01)

(58) Field of Classification Search
CPC .... F25B 21/02; F25B 21/00; F25B 2321/023; B60L 11/18; B60L 11/12; B60L 11/002; B60R 13/08; B60R 13/0884; B60R 13/0838; F02G 5/00; F02G 5/02; F02G 5/04; B62D 25/10; B62D 25/105

See application file for complete search history.

(56) References Cited

U.S. PATENT DOCUMENTS 4,148,192 A * 4/1979 Cummings ............ B60K 6/485
180/65.26
6,029,620 A * 2/2000 Zinke ...................... F02F 7/00
123/193.1

(Continued)

FOREIGN PATENT DOCUMENTS

JP 2001-210765 8/2001
JP 2001-332293 11/2001

(Continued)

OTHER PUBLICATIONS

English language translation of International Preliminary Report on Patentability in PCT/JP2013/061754, mailed date Mar. 3, 2015.

(Continued)

*Primary Examiner* — James M Dolak
(74) *Attorney, Agent, or Firm* — Greenblum & Bernstein, P.L.C.

(57) ABSTRACT

A vehicle noise-proof cover is provided which includes a thermoelectric element and which is capable of efficiently generating electric power. The vehicle noise-proof cover is placed so as to cover a driving force generating device of a vehicle. The vehicle noise-proof cover includes: a cover body having a noise absorption layer made of a foamed resin; a heat supply member having a heat collection portion that is placed on a back surface side of the cover body and directly or indirectly contacts the driving force generating device, a heat supply portion that is placed on a front surface side of the cover body, and a heat transfer portion that is connected to the heat collection portion and the heat supply portion and transfers heat from the heat collection portion to the heat supply portion.

9 Claims, 5 Drawing Sheets

(56) References Cited

U.S. PATENT DOCUMENTS

| | | | | |
|---|---|---|---|---|
| 6,605,773 | B2* | 8/2003 | Kok | B60L 11/12 136/242 |
| 7,287,506 | B1* | 10/2007 | Reiners | F02B 63/04 123/193.5 |
| 7,405,013 | B2* | 7/2008 | Yang | C01B 3/0005 420/900 |
| 7,878,283 | B2* | 2/2011 | Richter | F02G 5/00 180/68.1 |
| 8,261,862 | B2* | 9/2012 | Uchiyama | B60K 6/44 180/65.265 |
| 8,684,114 | B2* | 4/2014 | Schroeder | H01L 35/00 136/240 |
| 8,706,351 | B2 | 4/2014 | Hasegawa et al. | |
| 8,997,901 | B2* | 4/2015 | Shaffer | B60L 8/003 180/2.2 |
| 2006/0157102 | A1* | 7/2006 | Nakajima | F01N 5/025 136/205 |
| 2006/0216559 | A1* | 9/2006 | Olivier | H01L 35/22 429/435 |
| 2008/0245590 | A1* | 10/2008 | Yonak | B60K 6/48 180/165 |
| 2010/0243347 | A1 | 9/2010 | Uchiyama | |
| 2011/0220165 | A1 | 9/2011 | Lee et al. | |

FOREIGN PATENT DOCUMENTS

| | | |
|---|---|---|
| JP | 2008-19674 | 1/2008 |
| JP | 2009-55728 | 3/2009 |
| JP | 2012-225280 | 11/2012 |
| WO | 2008/020502 | 2/2008 |

OTHER PUBLICATIONS

International Search Report in PCT/JP2013/061754, mailed date Jul. 23, 2013.

* cited by examiner

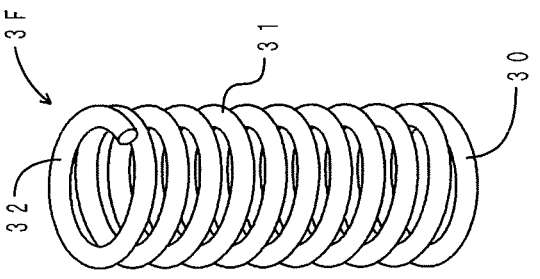
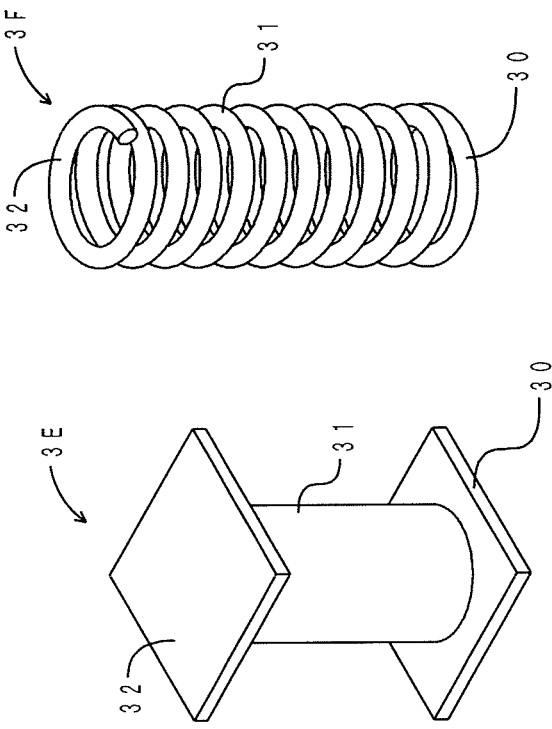
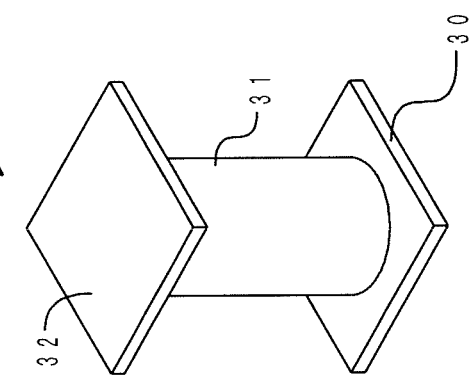
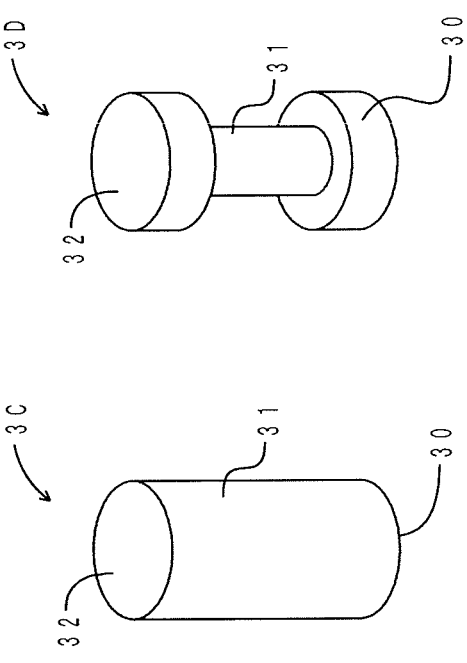

VEHICLE NOISE-PROOF COVER

CLAIM FOR PRIORITY

This application is a Continuation of PCT/JP2013/061754 filed on Apr. 22, 2013, and claims the priority benefit of Japanese application 2012-187481 filed on Aug. 28, 2012, the contents of which is expressly incorporated by reference herein in its entirety.

TECHNICAL FIELD

The present invention relates to noise-proof covers that are used to reduce noise and vibration of an engine etc. mounted on a vehicle, and more particularly to noise-proof covers including a thermoelectric element and capable of generating electric power by a temperature difference.

BACKGROUND ART

With an increasing number of electric parts being mounted on automobiles, a larger amount of electric power is required to operate the electric parts. A large capacity generator or battery is required in order to secure a power supply for them. The generator is driven by power from the engine. Accordingly, an increase in power supply causes reduction in fuel economy. In automobiles, a large amount of heat energy is discharged from driving force generating devices such as an engine and a motor. Accordingly, attempts have been made to generate electric power by using exhaust heat of the engine etc.

For example, Patent Document 1 discloses an energy recovery device having a thermoelectric element placed on the back surface of an engine hood. Patent Document 2 discloses an exhaust gas heat sink including a thermoelectric element. Patent Document 3 discloses a vehicle in which a temperature difference secondary battery using a redox couple is attached to an engine to generate electric power. Patent Document 4 discloses a power generation device using residual heat, which transfers heat from an engine to a thermoelectric element via a heat pipe to generate electric power.

RELATED ART DOCUMENTS

Patent Documents

[Patent Document 1] Japanese Patent Application Publication No. 2008-19674 (JP 2008-19674 A)
[Patent Document 2] Japanese Patent Application Publication No. 2001-210765 (JP 2001-210765 A)
[Patent Document 3] Japanese Patent Application Publication No. 2001-332293 (JP 2001-332293 A)
[Patent Document 4] Japanese Patent Application Publication No. 2009-55728 (JP 2009-55728 A)

SUMMARY OF THE INVENTION

Problem to be Solved by the Invention

Thermoelectric elements generate an electromotive force due to a temperature difference between a heating end and a cooling end by the Seebeck effect. The temperature difference between the heating end and the cooling end needs to be increased in order to increase power generation efficiency of the thermoelectric elements. In this regard, according to the energy recovery device described in Patent Document 1, the thermoelectric element is placed on the back surface of the engine hood. An air layer is present between the heating end of the thermoelectric element and an engine. Since the air layer has low thermal conductivity, heat transfer from the engine to the thermoelectric element is not sufficient. Moreover, since the cooling end is in contact with a sound absorption material that suppresses heat transfer to the front surface of the engine hood, heat dissipation from the cooling end is not sufficient. Accordingly, the temperature difference is small between the heating end and the cooling end of the thermoelectric element. The thermoelectric element can be directly attached to the engine to generate electric power. However, if the thermoelectric element is directly attached to the engine, the temperature around the thermoelectric element becomes high due to a large amount of heat dissipation from the engine. This makes it difficult to produce a large temperature difference in the thermoelectric element. That is, power generation efficiency is low.

As described above, an engine or a motor is mounted on automobiles as a device that generates a driving force. The engine generates vibration and noise in synchronization with explosion by explosion and friction. In the motor as well, noise is generated due to torque fluctuations caused by cogging or eccentricity, and high frequency noise is generated from an inverter. Accordingly, a noise-proof cover using urethane foam etc. is attached to the engine or the motor to suppress leakage of noise and vibration to the outside. A foam molded article such as urethane foam contains a large number of cells (air bubbles), and therefore has low thermal conductivity. Accordingly, in the case where a noise-proof cover is placed around the engine, the motor, etc. that generates heat, the heat is accumulated by the noise-proof cover.

The present invention was developed in view of such situations, and it is an object of the present invention to provide a vehicle noise-proof cover including a thermoelectric element and capable of efficiently generating electric power.

Means for Solving the Problem (1) In order to solve the above problems, a vehicle noise-proof cover according to the present invention is a vehicle noise-proof cover that is placed so as to cover a driving force generating device of a vehicle, characterized by including: a cover body having a noise absorption layer made of a foamed resin; a heat supply member having a heat collection portion that is placed on a back surface side of the cover body and directly or indirectly contacts the driving force generating device, a heat supply portion that is placed on a front surface side of the cover body, and a heat transfer portion that is connected to the heat collection portion and the heat supply portion and transfers heat from the heat collection portion to the heat supply portion; and a thermoelectric element that is placed so that its one end contacts the heat supply portion of the heat supply member, and that generates an electromotive force due to a temperature difference between the one end and the other end by Seebeck effect.

The driving force generating device of the vehicle includes an engine, a motor, etc. As described above, if the noise-proof cover is attached to the engine or the motor, heat is accumulated by the thermal insulation effect of the noise-proof cover. In the vehicle noise-proof cover of the present invention, this accumulated heat is effectively used to generate electric power by the thermoelectric element. The thermoelectric element is placed on the front surface side of the cover body, namely on the opposite side from the driving force generating device. Heat is supplied from the heat supply member to the thermoelectric element. The heat supply member has the heat collection portion, the heat supply portion, and the heat transfer portion.

The heat collection portion is placed on the back surface side of the cover body, namely on the driving force generating device side. The heat collection portion directly or indirectly contacts the driving force generating device. Heat of the driving force generating device is thus transferred to the heat collection portion. The heat transferred to the heat collection portion is transferred to the heat supply portion via the heat transfer portion. The heat supply portion is placed on the front surface side of the cover body. The heat supply portion is connected to the one end (heating end) of the thermoelectric element. The cover body has the noise absorption layer. The noise absorption layer is made of the foamed resin. The noise absorption layer therefore has high thermal insulation properties. Heat released from the driving force generating device is shielded by the cover body. Accordingly, on the front surface side of the cover body, the heat supply portion has a high temperature due to the heat transferred from the heat collection portion, but the temperature of its surrounding space, namely the space around the thermoelectric element, is less likely to increase. This can produce a large temperature difference between the one end (heating end) in contact with the heat supply portion) and the other end (cooling end) of the thermoelectric element. Accordingly, efficient thermoelectric power generation can be achieved.

Several hundreds of sensors are mounted on automobiles in order to improve traveling performance, safety, comfort, etc. A plurality of wirings such as power supply lines, earth lines, and signal lines are connected to the sensors. Accordingly, if the number of sensors is increased, the total weight of wire harness is increased, causing reduction in fuel economy. For example, if low power wireless communication is used to transmit sensor signals and switch signals, the total weight of wire harness is reduced. Accordingly, traveling performance, safety, comfort, etc. can be secured and fuel economy is improved by storing electric power generated by the vehicle noise-proof cover of the present invention in a battery and driving the sensors by using this electric power.

(2) It is preferable that, in the configuration of (1), the heat transfer portion be embedded in the noise absorption layer.

The heat transfer portion of the heat supply member connects the heat collection portion and the heat supply portion. The heat transfer portion may be embedded in the noise absorption layer. Alternatively, only a part of the heat transfer portion may be in contact with the noise absorption layer, or the heat transfer portion may not be in contact with the noise absorption layer at all. According to this configuration, since the heat transfer portion is entirely surrounded by the noise absorption layer, loss of heat transfer between the heat collection portion and the heat supply portion is reduced by the thermal insulation effect of the noise absorption layer. Accordingly, heat of the driving force generating device collected by the heat collection portion can be efficiently transferred to the heat supply portion, and can be efficiently supplied to the thermoelectric element.

(3) It is preferable that, in the configuration of (1) or (2), each of the heat collection portion and the heat supply portion have a plate shape, and the heat transfer portion be connected to a part of the heat collection portion and a part of the heat supply portion.

According to this configuration, the heat collection portion has a plate shape. This makes it easier to increase contact area of the heat collection portion with the driving force generating device, that is, heat transfer area. It is desirable that the heat collection portion and the heat supply portion be made of a metal material having high thermal conductivity such as aluminum, copper, or iron. The lighter the heat supply member is, the more desirable it is for improvement in fuel economy etc. By using the form in which the heat transfer portion is connected to a part of the heat collection portion and a part of the heat supply portion as in this configuration, the heat supply member can be reduced in weight as compared to, e.g., the form where the heat supply member is formed in the shape of a solid column (the form in which the heat transfer portion is connected to the entire heat collection portion and the entire heat supply portion).

(4) It is preferable that, in the configuration of any one of (1) to (3), the vehicle noise-proof cover further include a heat dissipation member that is placed on the other end of the thermoelectric element.

In order to enhance power generation efficiency of the thermoelectric element, it is more desirable that the temperature difference be larger between the one end (heating end) and the other end (cooling end) thereof. According to this configuration, the heat dissipation member is placed on the other end of the thermoelectric element. This reduces the temperature at the other end, and can further increase the temperature difference between the one end and the other end. Examples of the heat dissipation member include a heat dissipation plate, fins, a heat dissipation sheet, a coating film made of heat dissipating paint, and combinations thereof (5) It is preferable that in the configuration of (4), the heat dissipation member be formed of a urethane foam molded article containing urethane foam and magnetic fillers oriented so as to be connected to each other in the urethane foam.

The urethane foam molded article of this configuration contains the magnetic fillers oriented so as to be connected to each other. Examples of the magnetic fillers include iron, nickel, stainless steel, a copper-iron alloy, etc. Since the magnetic fillers have high thermal conductivity, heat applied to one end of the urethane foam molded article is transferred to the other end via the magnetic fillers and is quickly released According to this configuration, design of an engine cover can be improved if the vehicle noise-proof cover is embodied as the engine cover (see the configuration of (8) described below).

(6) It is preferable that, in the configuration of any one of (1) to (5), the heat supply member be insert-molded in the cover body.

According to this configuration, the heat supply member can be attached to the cover body simultaneously with foam molding of the noise absorption layer from the foamed resin. This eliminates the need for a separate step of attaching the heat supply member to the manufactured cover body. This simplifies the manufacturing process and can reduce manufacturing cost.

(7) It is preferable that, in the configuration of any one of (1) to (6), the foamed resin of the noise absorption layer be urethane foam.

According to this configuration, the vehicle noise-proof cover having high noise absorption capability can be implemented relatively inexpensively.

(8) It is preferable that, in the configuration of any one of (1) to (7), the driving force generating device be an engine, and the vehicle noise-proof cover be used as an engine cover.

The engine releases a large amount of heat by explosion and friction. According to this configuration, the heat released from the engine can be efficiently converted to electrical energy.

(9) It is preferable that, in the configuration of (8), the heat dissipation member be formed of a urethane foam molded article containing urethane foam and magnetic fillers oriented so as to be connected to each other in the urethane foam, and the heat dissipation member contact an engine hood.

During traveling of the vehicle, the engine hood is exposed to air and cooled. Accordingly, the heat dissipation effect can further be increased by making the heat dissipation member, which is placed on the other end (cooling end) of the thermoelectric element, in contact with the engine hood. However, in order to protect pedestrians in the event of a collision, a certain amount of space (shock absorbing space) needs to be secured between the engine hood and the engine cover. Accordingly, in the case where the heat dissipation member is made of a hard material such as a metal, the heat dissipation member cannot be made in contact with the engine hood.

In this respect, according to this configuration, a base material of the heat dissipation member is urethane foam. Accordingly, the heat dissipation member is elastic and relatively soft. The heat dissipation member can therefore be made in contact with the engine hood. This facilitates heat dissipation from the other end of the thermoelectric element, and can further increase the temperature difference between the one end and the other end. Moreover, since the heat dissipation member is elastic, the heat dissipation member is compressed by a pressing force from the engine hood, whereby a gap (air layer) between the heat dissipation member and the engine hood is eliminated, and heat transfer capability to the engine hood can be improved.

BRIEF DESCRIPTION OF THE DRAWINGS

FIGS. 5A-5D show perspective views of heat supply members of other embodiments.

DESCRIPTION OF THE REFERENCE NUMERALS

1: Engine Cover, 10: Recess, 11: Bolt, 12: Washer, 100: Insertion Hole

2: Cover Body, 20: Noise Absorption Layer, 21: Surface Layer 3A to 3F: Heat Supply Member, 30: Heat Collection Portion, 31: Heat Transfer Portion, 32: Heat Supply Portion, 300: Through Hole 4: Thermoelectric Element 50: Heat Dissipation Plate (Heat Dissipation Member), 51: Heat Dissipation Member 80: Cylinder Head Cover (Driving Force Generating Device), 81: Engine Hood

MODES FOR CARRYING OUT THE INVENTION

Embodiments of a vehicle noise-proof cover of the present invention will be described below. In the embodiments, the vehicle noise-proof cover of the present invention is embodied as an engine cover.

First Embodiment

Configuration

Figure 1:
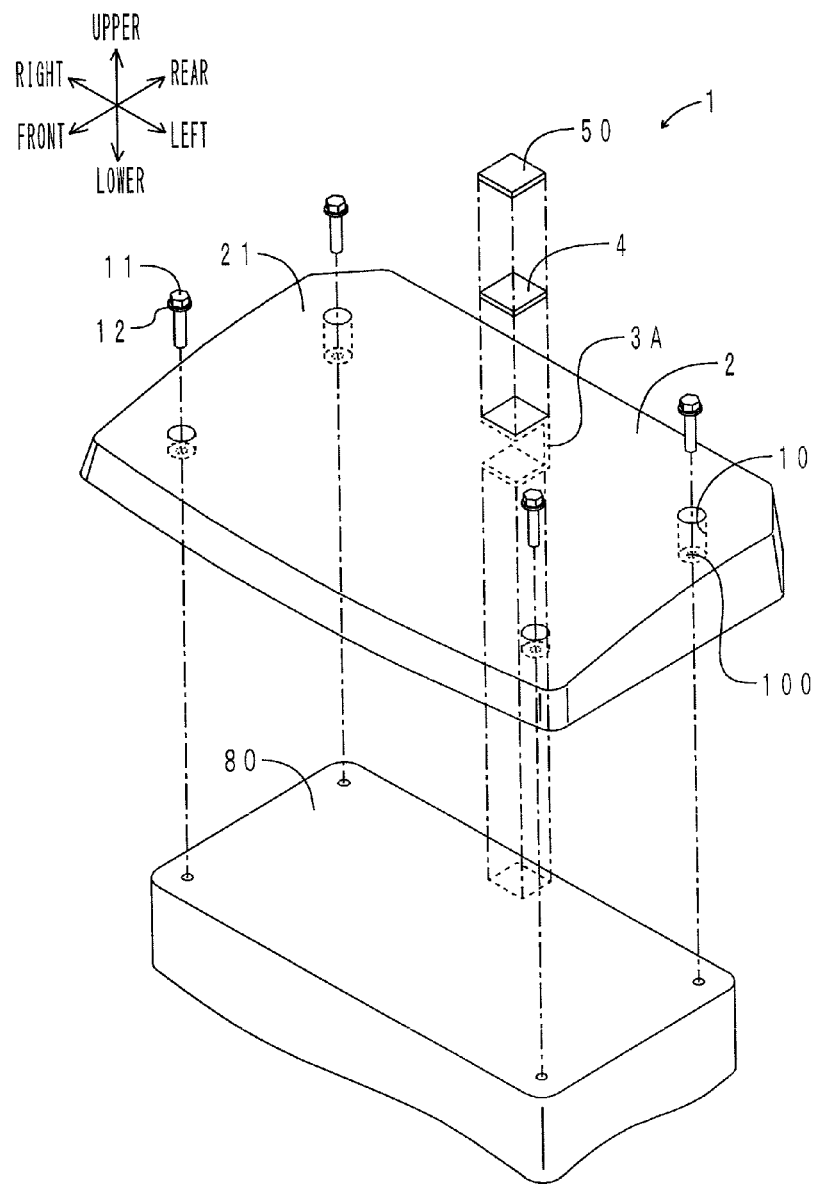
FIG. 1 is an exploded perspective view of an engine cover of a first embodiment.
Figure 2:
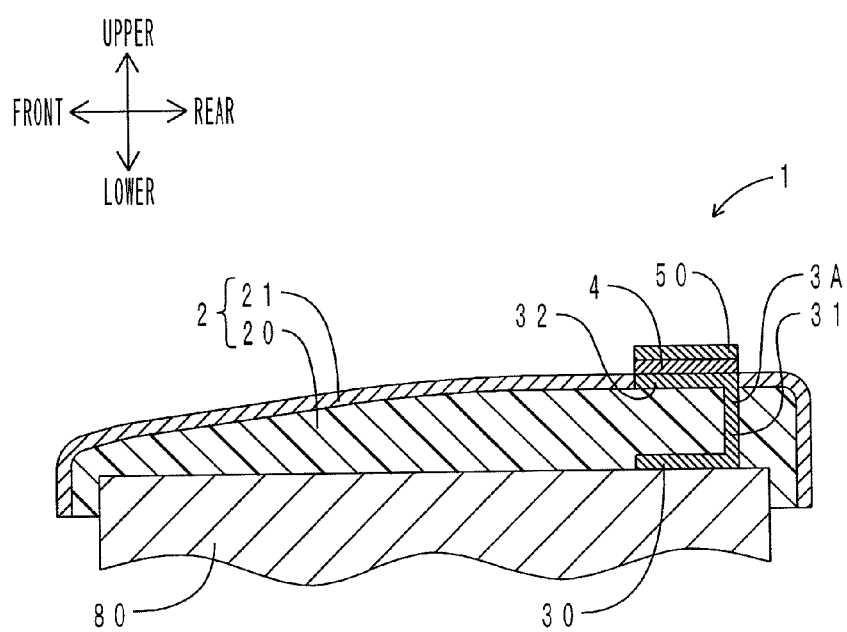
FIG. 2 is a sectional view taken along the front-rear direction of the engine cover.

First, the configuration of an engine cover of the present embodiment will be described. FIG. 1 is an exploded perspective view of the engine cover of the present embodiment. FIG. 2 is a sectional view taken along the front-rear direction of the engine cover. In FIGS. 1 and 2, the directions are defined as viewed facing forward from the rear of the vehicle. As shown in FIGS. 1 and 2, an engine cover 1 is placed so as to cover a cylinder head cover 80 as a constituent member of an engine. A recess 10 for a bolt 11 to be inserted therein is formed in the four corners of the engine cover 1. Each of the four recesses 10 has an insertion hole 100 for the bolt 11 to be inserted therethrough. The bolt 11 extends through the insertion hole 100 via a washer 12, and is fixed to the cylinder head cover 80, whereby the engine cover 1 is attached to the upper surface of the cylinder head cover 80.

The engine cover 1 includes a cover body 2, a heat supply member 3A, a thermoelectric element 4, and a heat dissipation plate 50. The cover body 2 has a noise absorption layer 20 and a surface layer 21. The noise absorption layer 20 is made of urethane foam and is in the shape of a shallow tray that opens downward. The surface layer 21 is made of polyamide resin. The surface layer 21 is formed on the upper surface of the noise absorption layer 20. The surface layer 21 is exposed in an engine compartment.

The heat supply member 3A is placed at a position that is located in the center in the left-right direction and closer to the rear of the cover body 2. The heat supply member 3A has a C-shape that opens forward. The heat supply member 3A has a heat collection portion 30, a heat supply portion 32, and a heat transfer portion 31.

The heat collection portion 30 is made of aluminum and is in the shape of a rectangular plate. The heat collection portion 30 is disposed on the lower surface side (back surface side) of the cover body 2. The heat collection portion 30 is embedded in the noise absorption layer 20 such that only the lower surface of the heat collection portion 30 is exposed downward. The lower surface of the heat collection portion 30 is flush with the lower surface of the noise absorption layer 20. The lower surface of the heat collection portion 30 is in direct contact with the cylinder head cover 80.

The heat supply portion 32 is made of aluminum and is in the shape of a rectangular plate. The heat supply portion 32 is disposed so as to face the heat collection portion 30. The heat supply portion 32 is disposed on the upper surface side (front surface side) of the cover body 2. The noise absorption layer 20 is interposed between the heat supply portion 32 and the heat collection portion 30. The heat supply portion 32 is embedded in the surface layer 21 such that only the upper surface of the heat supply portion 32 is exposed upward. The upper surface of the heat supply portion 32 is flush with the upper surface of the surface layer 21.

The heat transfer portion 31 is made of aluminum and is in the shape of a rectangular plate. The heat transfer portion 31 is connected to the rear end of the heat collection portion 30 and the rear end of the heat supply portion 32. The heat transfer portion 31 is embedded in the noise absorption layer 20.

The thermoelectric element 4 is a bulk element using a bismuth tellurium ($Bi_2Te_3$)-based thermoelectric conversion material. The thermoelectric element 4 is disposed on the upper surface of the heat supply member 3A, i.e., the upper surface of the heat supply portion 32. The lower end of the thermoelectric element 4 serves as a heating end, and the upper end thereof serves as a cooling end. The lower end of the thermoelectric element 4 is included in the concept of "one end" of the present invention. The upper end of the thermoelectric element 4 is included in the concept of the "other end" of the present invention. The thermoelectric element 4 is connected to a battery, not shown, via wiring.

The heat dissipation plate 50 is made of aluminum and has a rectangular shape. The heat dissipation plate 50 is placed on the upper surface of the thermoelectric element 4. The heat dissipation plate 50 is included in the concept of the "heat dissipation member" of the present invention.

Manufacturing Method

A method for manufacturing the engine cover 1 of the present embodiment will be described below. First, the surface layer 21 that has been molded in advance is attached to an upper mold of a mold. Next, the heat supply member 3A is fixed to a lower mold of the mold, and a urethane foam material is injected therein. The upper mold having the surface layer 21 attached thereto is placed on the lower mold, and the mold is closed to perform foam molding. Then, the mold is opened to remove an integral molded article of the surface layer 21, the noise absorption layer 20, and the heat supply member 3A therefrom. Thereafter, the thermoelectric element 4 is bonded to the upper surface of the heat supply portion 32. Moreover, the heat dissipation plate 50 is bonded to the upper surface of the thermoelectric element 4. The engine cover 1 is thus manufactured.

Power Generation Method

A method for generating electric power by the engine cover 1 of the present embodiment will be described. When the engine is operated, heat is generated due to explosion and friction. The generated heat is transferred to the heat collection portion 30 of the heat supply member 3A through the cylinder head cover 80. The heat transferred to the heat collection portion 30 is transferred from the heat transfer portion 31 to the heat supply portion 32. The heat supply portion 32 thus becomes hot. This increases the temperature of the lower end of the thermoelectric element 4 which is in contact with the heat supply portion 32. However, the temperature of the upper end of the thermoelectric element 4 does not increase so much mainly due to the thermal insulation effect of the noise absorption layer 20 and the heat dissipation effect of the heat dissipation plate 50. Accordingly, there is a temperature difference between the lower and upper ends of the thermoelectric element 4. With this temperature difference, the thermoelectric element 4 produces an electromotive force by the Seebeck effect of its thermoelectric conversion material. The electric power generated in the thermoelectric element 4 is boosted and then stored in the battery.

Functions and Effects

Functions and effects of the engine cover 1 of the present embodiment will be described below. In the engine cover 1, the noise absorption layer 20 forming the cover body 2 is made of urethane foam. The noise absorption layer 20 therefore has high thermal insulation properties. The heat collection portion 30 and the heat supply portion 32 of the heat supply member 3A are disposed so as to face each other in the vertical direction with the noise absorption layer 20 interposed therebetween. The heat transfer portion 31 connecting the heat collection portion 30 and the heat supply portion 32 is embedded in the noise absorption layer 20. Each of the heat collection portion 30, the heat transfer portion 31, and the heat supply portion 32 which form the heat supply member 3A is made of aluminum having high thermal conductivity. This allows heat released from the engine to be transferred from the heat collection portion 30 to the heat supply portion 32 without significant loss. That is, the heat released from the engine can be efficiently supplied to the thermoelectric element 4. The temperature in the space on the upper surface side of the cover body 2, namely the space around the thermoelectric element 4, is less likely to increase mainly due to the thermal insulation effect of the noise absorption layer 20. Accordingly, a large temperature difference can be obtained between the lower end (heating end) and the upper end (cooling end) of the thermoelectric element 4. Efficient thermoelectric power generation can therefore be achieved. That is, according to the engine cover 1, heat released from the engine can be efficiently converted to electrical energy.

The electric power generated by the engine cover 1 can be stored in the battery and can be used to operate various electric parts. For example, the use of this electric power as a driving power source of a sensor can improve traveling performance, safety, comfort, etc. without reducing fuel economy.

The heat supply member 3A has a C-shape. The heat supply member 3A can therefore be easily manufactured by press forming etc. The heat supply member 3A is lighter compared to the case where it is formed in the shape of a solid column. The heat supply member 3A is formed integrally with the noise absorption layer 20 and the surface layer 21 by an insert molding method. This eliminates the need to attach the heat supply member to the manufactured cover body in a separate step. This simplifies the manufacturing process, and can reduce manufacturing cost.

The heat dissipation plate 50 is placed on the upper surface of the thermoelectric element 4. Since the temperature of the upper end of the thermoelectric element 4 can be reduced by the heat dissipation effect of the heat dissipation plate 50, the temperature difference between the upper and lower ends thereof can further be increased.

The noise absorption layer 20 of the cover body 2 is made of urethane foam. The noise absorption layer 20 therefore has great noise absorption capability. Moreover, the noise absorption layer 20 can be manufactured at relatively low cost. The heat supply member 3A and the heat dissipation plate 50 are both made of aluminum. The engine cover 1 is therefore relatively inexpensive and light.

Second Embodiment

An engine cover of the present embodiment is different from that of the first embodiment in that the heat dissipation plate made of aluminum is replaced with a heat dissipation member as a urethane foam molded article and in that the heat dissipation member is in contact with an engine hood. Only the differences will be described be low.

Figure 3:
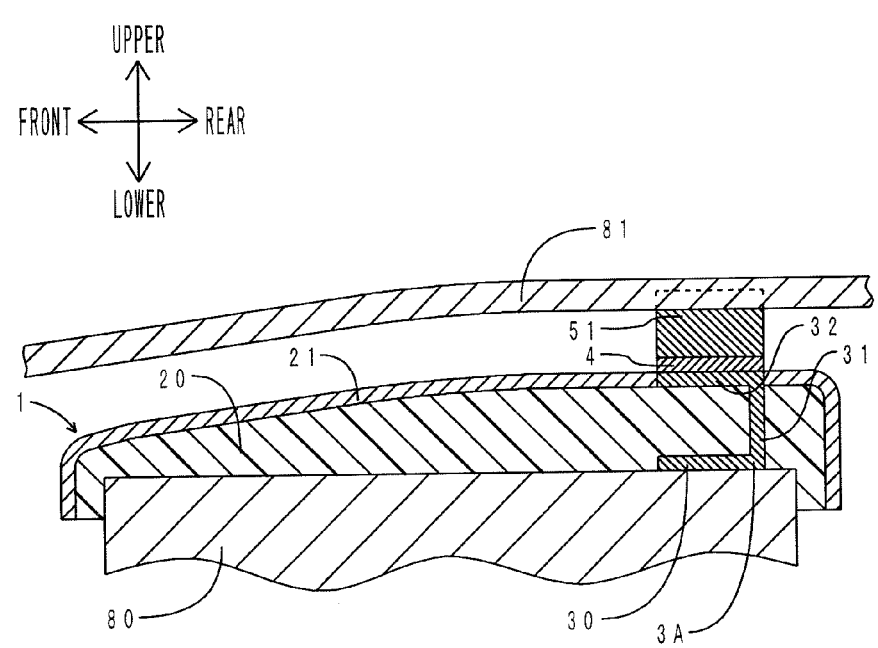
FIG. 3 is a sectional view taken along the front-rear direction of an engine cover of a second embodiment.

FIG. 3 is a sectional view taken along the front-rear direction of the engine cover of the present embodiment. The portions corresponding to those of FIG. 2 are denoted by the same reference characters. As shown in FIG. 3, an engine hood 81 is placed over the engine cover 1. A heat dissipation member 51 is placed on the upper surface of the thermoelectric element 4. The heat dissipation member 51 is interposed between the engine hood 81 and the thermoelectric element 4. The heat dissipation member 51 is placed in such a state that it is compressed in the vertical direction from its natural state (shown by broken line in FIG. 3) by a pressing force from the engine hood 81.

The heat dissipation member 51 has the shape of a rectangular parallelepiped. The heat dissipation member 51 is formed of a urethane foam molded article containing magnetic fillers. The magnetic fillers are stainless steel fibers. The magnetic fillers are connected to each other and are oriented in the vertical direction in the urethane foam molded article (heat dissipation member 51).

Regarding the portions having the same configuration as the first embodiment, the engine cover 1 of the present embodiment has similar functions and effects to those of the engine cover of the first embodiment. According to the engine cover 1 of the present embodiment, the heat dissipation member 51 is in contact with the engine hood 81. This facilitates heat dissipation from the upper end of the thermoelectric element 4, and can further increase the temperature difference between the upper and lower ends thereof The heat dissipation member 51 contains oriented magnetic fillers, and therefore has a high heat dissipation effect. Moreover, a base material of the heat dissipation member 51 is urethane foam. Accordingly, the heat dissipation member 51 is elastic and relatively soft. The heat dissipation member 51 can therefore be interposed in a compressed state between the thermoelectric element 4 and the engine hood 81. Thus, there is no gap (air layer) between the heat dissipation member 51 and the engine hood 81, and heat transfer capability to the engine hood 81 can be improved.

Third Embodiment

An engine cover of the present embodiment is different from the engine cover of the first embodiment in the position and shape of the heat supply member. Only the differences will be described below.

Figure 4:
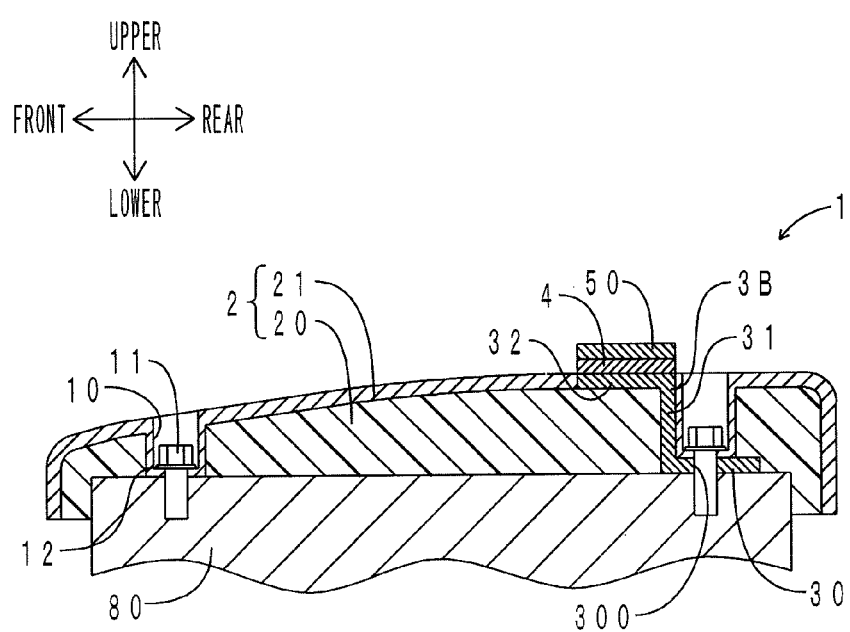
FIG. 4 is a sectional view taken along the front-rear direction of an engine cover of a third embodiment.

FIG. 4 is a sectional view taken along the front-rear direction of the engine cover of the present embodiment. The portions corresponding to those of FIG. 2 are denoted by the same reference characters. As shown in FIGS. 1 and 4, a heat supply member 3B is placed on the right rear part of the cover body 2. The heat supply member 313 has a stepped shape in the front-rear direction. The heat supply member 3B has the heat collection portion 30, the heat supply portion 32, and the heat transfer portion 31.

The heat collection portion 30 is made of aluminum and is in the shape of a rectangular plate. The heat collection portion 30 is placed on the lower surface side (back surface side) of the engine cover 1. The heat collection portion 30 is embedded in the noise absorption layer 20 such that only the lower surface of the heat collection portion 30 is exposed downward. The lower surface of the heat collection portion 30 is flush with the lower surface of the noise absorption layer 20. The lower surface of the heat collection portion 30 is in direct contact with the cylinder head cover 80. The heat collection portion 30 has a through hole 300 for the bolt 11 to be inserted therethrough. The bolt 11 inserted from the surface layer 21 side extends through the through hole 300 and is fixed to the cylinder head cover 80.

The heat supply portion 32 is made of aluminum and is in the shape of a rectangular plate. The heat supply portion 32 is disposed on the upper surface side (front surface side) of the engine cover 1. The heat supply portion 32 is placed forward of the heat collection portion 30. The heat supply portion 32 is embedded in the surface layer 21 such that only the upper surface of the heat supply portion 32 is exposed upward. The upper surface of the heat supply portion 32 is flush with the upper surface of the surface layer 21.

The heat transfer portion 31 is made of aluminum and is in the shape of a rectangular plate. The heat transfer portion 31 is connected to the front end of the heat collection portion 30 and the rear end of the heat supply portion 32. The heat transfer portion 31 is interposed between the noise absorption layer 20 and the surface layer 21 in the front-rear direction.

Regarding the portions having the same configuration as the first embodiment, the engine cover 1 of the present embodiment has similar functions and effects to those of the engine cover of the first embodiment. According to the engine cover 1 of the present embodiment, the heat collection portion 30 together with the cover body 2 is fixed to the cylinder head cover 80. This allows the heat collection portion 30 to contact the cylinder head cover 80 with no gap therebetween. The heat supply member 3B is placed at the position of the bolt 11 that fixes the cover body 2. Accordingly, the heat supply member 3B is less likely to adversely affect the design of the engine cover 1, and is less likely to hinder the members on the engine side.

Others

The embodiments of the engine cover of the present invention are described above. However, embodiments are not particularly limited to the above embodiments. The present invention can be embodied in various modified forms or improved forms, and various modifications and improvements can be made by those skilled in the art.

For example, in the above embodiments, the vehicle noise-proof cover of the present invention is embodied as an engine cover. However, the vehicle noise-proof cover of the present invention may be embodied as a noise-proof cover for driving-force generating devices other than the engine, such as a motor.

The shape of the heat supply member is not limited to the above embodiments. FIGS. 5A-5D show other examples of the shape of the heat supply member. The heat supply member may have a cylindrical shape like a heat supply member 3C shown in FIG. 5A. In this case, one of its bottom surfaces serves as the heat collection portion 30 and the other bottom surface serves as the heat supply portion 32. The heat supply member may have a dumbbell shape like a heat supply member 3D shown in FIG. 5B. The heat supply member may have an I-shape like a heat supply member 3E shown in FIG. 5C. The heat supply member may have the shape of a coil spring like a heat supply member 3F shown in FIG. 5D. The heat supply member 3F is elastic and therefore can be deformed according to deformation of the cover body. This improves shock absorption capability of the vehicle noise-proof cover.

The size of the heat supply member is not particularly limited. The size of the heat collection portion may not be the same as that of the heat supply portion. For the heat supply member, it is desirable to provide a larger area of the heat collecting portion which contacts the driving force generating device. The size of the heat supply portion can be determined as appropriate according to the size of one end of the thermoelectric element. In the heat supply member, the heat collection portion, the heat transfer portion, and the heat supply portion may be made of either the same material or different materials from each other. It is desirable that each of the heat collection portion, the heat transfer portion, and the heat supply portion be made of a material having high thermal conductivity. For example, a metal such as aluminum, copper, or iron is preferred. The smaller the mass of the heat supply member is, the more desirable it is.

In the above embodiments, the lower surface of the heat collection portion is flush with the lower surface of the noise absorption layer. Similarly, the upper surface of the heat supply portion is flush with the upper surface of the surface layer. However, the heat collection portion may be placed so as to protrude from the noise absorption layer toward the driving force generating device. Similarly, the heat supply portion may be placed so as to protrude from the surface layer (cover body) toward the thermoelectric element. In the case where the heat collection portion is made to protrude from the noise absorption layer, a sheet member having high thermal conductivity may be interposed between the heat collection portion and the driving force generating device so that neither abnormal noise nor wobbling is caused by the contact between the heat collection portion and the driving force generating device. An example of such a sheet member is a urethane foam molded article containing a highly thermally conductive filler. Thus, the heat collection portion may either directly contact the driving force generating device or indirectly contact the driving force generating device with the sheet member etc. interposed therebetween.

In the first and second embodiments, the heat transfer portion is embedded in the noise absorption layer. However, a part of the heat transfer portion may contact the noise absorption layer as in the third embodiment, or the heat transfer portion may not contact the noise absorption layer at all.

In the above embodiments, the heat supply member and the cover body are integrally molded by an insert molding method. However, the manufacturing method of the vehicle noise-proof cover of the present invention is not limited to the above embodiments. The heat supply member and the cover body which are manufactured separately may be attached to each other.

The thermoelectric element is not limited to the bulk structure, and a thermoelectric element having a thin film structure may be used. The thermoelectric conversion material to be used is not particularly limited.

In the above embodiments, the heat dissipation member is placed on the upper surface of the thermoelectric element. However, the heat dissipation member may not be provided. Even if the heat dissipation member is placed, the material, shape, etc. thereof are not limited to the above embodiments. In addition to the metal heat dissipation plate as in the first embodiment and the urethane foam molded article of the second embodiment, a fin, a heat dissipation sheet, a coating film made of heat dissipating paint, etc. can be used in combinations as appropriate.

The material of the noise absorption layer of the cover body is not limited to urethane foam. Various foamed resins such as silicone foam can be used for the noise absorption layer. The material of the noise absorption layer may be a foamed resin containing a highly thermally conductive filler. The material of the surface layer is not limited to polyamide resin. Resins such as polyester resin, polycarbonate resin, and polyolefin resin can be used for the surface layer. The surface layer may be formed by an in-mold forming method by using urethane resin-based paint or acrylic resin-based paint. In this case, the surface layer may be formed on the surface of the noise absorption layer by coating the molding surface of a mold with the paint and then injecting a foamed resin material therein to perform foam molding.

The difference in the amount of power generation of the thermoelectric element between the configuration having a heat insulating material and the configuration having no heat insulating material was examined by the following experiments.

Example (with a Heat Insulating Material)

First, an engine cover having the same configuration as the first embodiment except the shape of the heat supply member was attached to the upper surface of a cylinder head cover. A cylindrical member made of aluminum (see FIG. 5A described above) was used as the heat supply member. The lower surface (heat collecting portion) of the cylindrical member (heat supply member) was in direct contact with the upper surface of the cylinder head cover. The upper surface (heat supply portion) of the cylindrical member was in direct contact with a thermoelectric element. The side surface of the cylindrical member was surrounded by the noise absorption layer. That is, the heat transfer portion of the heat supply member was embedded in the noise absorption layer. Next, the engine was operated, and the temperature difference between the upper and lower ends of the thermoelectric element and the amount of power generation of the thermoelectric element were measured. The measured temperature difference was 5 to 8° C., and the measured amount of power generation was about 1 mW.

Comparative Example (with No Heat Insulating Material)

First, a cylindrical heat supply member made of aluminum was placed on the upper surface of a cylinder head cover. Next, a thermoelectric element was placed on the upper surface of the heat supply member, and a heat dissipation plate made of aluminum was placed thereon. All of the heat supply member, the thermoelectric element, and the heat dissipation plate are the same as those of the above example. Then, the engine was operated, and the temperature difference between the upper and lower ends of the thermoelectric element and the amount of power generation of the thermoelectric element were measured. The measured temperature difference was 2 to 3° C., and the measured amount of power generation was about 500 μW.

Evaluation

As in the comparative example, if there is no heat insulating material (mainly the noise absorption layer of the cover body) between the thermoelectric element and the cylinder head cover (heat source), not only the temperature of the lower end of the thermoelectric element but also the temperature around the thermoelectric element increases. The temperature difference between the upper and lower ends of the thermoelectric element was therefore small.

On the other hand, as in the example, if there is a heat insulating material (mainly the noise absorption layer of the cover body) between the thermoelectric element and the cylinder head cover (heat source), the temperature around the thermoelectric element does not tend to increase. The temperature difference between the upper and lower ends of the thermoelectric element was large, and the amount of power generation was large.

The invention claimed is:

1. A vehicle noise-proof cover that is placed so as to cover a driving force generating device of a vehicle, comprising:
   a cover body having a noise absorption layer made of a foamed resin;
   a heat supply member having a heat collection portion that is placed on a back surface side of the cover body and directly or indirectly contacts the driving force generating device, a heat supply portion that is placed on a front surface side of the cover body, and a heat transfer portion that is connected to the heat collection portion and the heat supply portion and transfers heat from the heat collection portion to the heat supply portion; and
   a thermoelectric element that is placed so that one end of the thermoelectric element contacts the heat supply portion of the heat supply member, and therein generates an electromotive force due to a temperature difference between the one end and the other end of the thermoelectric element by the Seebeck effect.

2. The vehicle noise-proof cover according to claim 1, wherein
the heat transfer portion is embedded in the noise absorption layer.

3. The vehicle noise-proof cover according to claim 1, wherein
each of the heat collection portion and the heat supply portion has a plate shape, and
the heat transfer portion is connected to a part of the heat collection portion and a part of the heat supply portion.

4. The vehicle noise-proof cover according to claim 1, further comprising:
a heat dissipation member that is placed on the other end of the thermoelectric element.

5. The vehicle noise-proof cover according to claim 4, wherein
the heat dissipation member is formed of a urethane foam molded article containing urethane foam and magnetic fillers oriented so as to be connected to each other in the urethane foam.

6. The vehicle noise-proof cover according to claim 1, wherein
the heat supply member is insert-molded in the cover body.

7. The vehicle noise-proof cover according to claim 1, wherein
the foamed resin of the noise absorption layer is urethane foam.

8. The vehicle noise-proof cover according to claim 1, wherein
the driving force generating device is an engine, and the vehicle noise-proof cover is used as an engine cover.

9. The vehicle noise-proof cover according to claim 8, wherein
the heat dissipation member is formed of a urethane foam molded article containing urethane foam and magnetic fillers oriented so as to be connected to each other in the urethane foam, and
the heat dissipation member contacts an engine hood.

* * * * *